United States Patent Office 3,578,620
Patented May 11, 1971

3,578,620
COLOR STABILIZED UNSATURATED INTERPOLYMERS
Paul J. Prucnal, Monroeville, Pa., assignor to PPG Industries, Inc., Pittsburgh, Pa.
No Drawing. Filed Apr. 2, 1969, Ser. No. 812,888
Int. Cl. C08f 45/58
U.S. Cl. 260—23.7                          15 Claims

ABSTRACT OF THE DISCLOSURE

This invention relates to the stabilization and especially the color stabilization of certain unsaturated hydrocarbon polymers which are non-rubbery interpolymers of a cyclic polyene and at least one monoolefin, said interpolymer having an essentially saturated carbon chain containing a substantial proportion of the total carbon atoms in the polymer molecule and containing sufficient ethylenically unsaturated groups in the polymer molecule to permit substantial curing of films thereof by an oxidative mechanism, said interpolymers having an intrinsic viscosity of 0.6 or less. The stabilizers, which do not prevent oxidative cure, are a combination of epoxides such as epoxidized soybean oil or epoxidized higher fatty acid esters and tri-(alkylphenyl)phosphites.

---

In applications Ser. Nos. 413,326, filed Nov. 23, 1964, now U.S. Pat. No. 3,496,129; 460,544, filed June 1, 1965; and 473,235, filed July 19, 1965, now abandoned, as well as Belgian Pat. 692,486 and French Pats. 1,492,157 and 1,487,010, which are incorporated by reference, and elsewhere, there is described a group of non-rubbery; unsaturated interpolymers which are particularly useful as coating compositions. These compositions, while extremely useful, have been found at times to yellow at least sufficiently to render them unattractive for use by those desiring a clear or light-colored decorative finish.

It has now been found that yellowing in these compositions can be eliminated or at least greatly reduced by employing a mixture of an epoxide and a phosphite as a color stabilizer, which stabilizer does not prevent oxidative curing.

The combination of an epoxide and a phosphite has previously employed as an anti-oxidant for high-molecular weight unsaturated elastomers (see U.S. Pat. No. 3,361,-691, for example). This combination of stabilizers was, in fact, specifically utilized to stabilize against discoloration on heat aging; however, the art shows that the stabilizer combination retarded the absorption of oxygen. Surprisingly, this combination of stabilizers prevents discoloration of the interpolymers of the invention without preventing the oxidative cure of the instant interpolymers.

The epoxides employed in the invention are soluble in hydrocarbon solvents and substantially insoluble in water and are selected from the group consisting of epoxidized soybean oil and epoxidized higher fatty acid esters, for example, esters of $C_{10}$ to $C_{30}$ fatty acids with alkanols having up to 10 carbon atoms, for example, methanol, ethanol, octyl alcohol and decyl alcohol and the like. Commonly available epoxidized soybean oils include such materials as Paraplex G–60, G–61 and G–62, having an average molecular weight of about 1000 (see U.S. Pat. No. 2,829,135). Epoxidized higher fatty acids include octyl epoxy stearate (Drapex 3.2) having a molecular weight of 410 and an epoxidized oleate ester (Monoplex S–71), having an average molecular weight of 380. Generally epoxide content in such materials averages from about 2 percent to about 10 percent.

The alkyl phosphite employed in conjunction with the described epoxide is typically a tri(alkylphenyl)phosphite, preferably having alkyl groups containing between 8 and 30 carbon atoms (see U.S. Pat. No. 2,733,226). Examples of these phosphites include tri(o-octylphenyl)phosphite, tri(p-nonylphenyl)phosphite, tri(p-dodecylphenyl)phosphite, tri(di-nonylphenyl)phosphite, nonylphenyl phosphite, di(octylphenyl)phosphite, tri(nonylphenyl)phosphite isomers, and the like.

The interpolymers of this invention contain a substantial proportion of a polyunsaturated hydrocarbon, preferably having nonconjugated ethylenic groups, and interpolymerized therewith at least one monoolefin having a single copolymerizable ethylenic group. The interpolymers are obtained by polymerization in the presence of a transition metal catalyst, and they are further characterized by containing sufficient remaining ethylenic unsaturation in the polymermolecule to permit substantial curing of films thereof by oxidative mechanism.

Substantial curing by oxidative mechanism means that a thin film of the material upon exposure to air cures sufficiently to become tack-free and essentially insoluble in aliphatic hydrocarbons, such as heptane. Films of the interpolymers contemplated herein cure by auto-oxidation, whereby they absorb oxygen from the air and build up a crosslinked structure, probably through the formation of intermediate hydroperoxides and other oxygenated compounds. While curing may continue for days, or even weeks, sufficient curing to achieve a tack-free state takes place within a reasonable time, 24 hours usually being taken as indicative.

The temperature of curing can vary. The preferred interpolymers substantially cure at ambient temperatures, and in any event below 100° F., but desirable materials can be produced which require somewhat higher curing temperatures, although in all cases the cure mechanism is oxidative. It is to be understood that in defining the interpolymers herein, the curing properties set forth do not limit the possible methods of curing that can be used, for example, driers, such as metal naphthenates, can be employed to accelerate the cure, or a high oxygen atmosphere and higher temperatures than the minimum necessary can be used for the same purpose. Crosslinking agents can also be added, or cure can be induced by ultaviolet or other radiation, with or without the presence of photosensitizers, such as benzophenones.

The non-rubbery interpolymers of the present invention differ from the rubbery polymers known heretofore in several important respects, including the following:

(1) The interpolymers herein contain a comparatively high degree of functional unsaturation. This permits their curing by an oxidative mechanism to a highly crosslinked structure, whereas the rubbery polymers cannot be cured to this extent and require the use of a vulcanizing agent to achieve any degree of cure at all. The preferred interpolymers produced in accordance with this invention contain at least about 2 weight percent unsaturation, as defined below, and may have up to about 25 percent or even more. The rubbery polymers used as elastomers contain at most about 2 weight percent unsaturation, and generally less. It is extremely difficult to accurately determine unsaturation of these polymers by the iodine value procedure; however, the iodine values calculated from the level of unsaturation of the interpolymers herein are higher than those of the common rubbery polymers.

(2) As indicated, the mechanism of curing of these interpolymers differs from that of the rubbery polymers, and the extent of crosslinking thereby achieved is much higher. Whereas the rubbery polymers have a very low crosslink density, even if vulcanized, films of the present interpolymers are, contrastingly, air-drying, and when air-dried are sufficiently cured to achieve the properties necessary in a desirable coating, i.e., hardness, mar resistance, abrasion resistance, and the like. The mechanism of cure is oxidative, involving, the reaction of oxygen with the unsaturated linkages. This is evidenced, for example, by continuous infra-red spectrographic examinations of a film, which shows a progressive increase in oxidation products, such as carbonyl, during curing.

(3) The interpolymers of this invention are of lower molecular weight than the rubbery polymers, as indicated by their lower intrinsic viscosity. (Intrinsic viscosity is described, for example, in the book by Allen entitled Techniques of Polymer Characterization, Butterworth Publications, Ltd., London (1959); the values herein being measured in benzene at 25° C., using an Ubbelohde dilution viscometer.) The intrinsic viscosity of the known rubbery polymers is at least 1.0, and usually 1.5 or higher, corresponding to a molecular weight of 50,000 or more. This is generally considerably higher than the intrinsic viscosity of the present interpolymers, which have an intrinsic viscosity no higher than about 0.6, and preferably no higher than 0.4, and usually quite lower.

(4) The present interpolymers are much more soluble in organic solvents than are the aforesaid rubbery polymers and can be dissolved in appreciable concentrations while maintaining a usable solution viscosity. For example, the preferred interpolymers have a Gardner-Holdt viscosity of Z or lower at 20 percent solids concentration in Solvesso 100 (aromatic naphtha) or xylene. This permits their use as a film-forming component in organic solvent-based coating compositions and, therefore, they can be used to provide stable coating compositions having desirable application properties. Solutions of rubbery polymers containing only about 10 to 15 percent solids have a completely unworkable viscosity, whereas there can be obtained solutions of the present interpolymers in benzene, xylene, aromatic naphtha or solvents containing as much as 70 percent or more resin solids having a utilizable viscosity.

(5) The present interpolymers, even when cured in a typical rubber formulation, do not display the characteristics attributed by the art to rubbers and elastomers.

In addition to their advantages over the related rubbery polymers, the interpolymers of the invention are highly advantageous as compared, for example, to the polymers of butadiene which have been employed in coating compositions. For instance, polybutadiene and butadiene-styrene copolymers result in brittle films which are useful only in very thin coatings, or which must be highly plasticized or otherwise modified to achieve the desired properties; thicker films of these materials can be cured only with extreme difficulty. The present interpolymers, on the other hand, are inherently flexible even in relatively thick coatings, and articles coated with these interpolymers can be formed and fabricated without destroying the continuity of the film.

Such differences are attributable in large part to the differing basic structure of the present interpolymers. These interpolymers have an essentially saturated carbon chain as the polymer backbone containing a substantial proportion (i.e., 20 percent or more) of the total carbon atoms in the polymer molecule. This polymer backbone, while essentially or predominantly saturated, contains some ethylenic unsaturation, principally in terminal position. At least a major part of the unsaturated linkages remaining in the polymer molecules are in pendant groups attached to the main polymer chain and are derived from the ethylenic linkages in the polyunsaturated component of the interpolymer.

The extent of unsaturation is sufficient to permit curing by oxidative mechanism, which in general requires at least about 2 percent by weight of unsaturation in the polymer. "Percent by weight of unsaturation," as employed herein, refers to the weight of groups of the structure

compared to the total weight of the interpolymer. For instance, two percent by weight of unsaturation means each 100 grams of interpolymer contain two grams of carbon present in groups of the structure

The extent of unsaturation in a large part determines the curing characteristics of coatings made from the interpolymer and the preferred materials have at least about 2.5 percent by weight of unsaturation. For good curing characteristics at ordinary room temperatures, it is desirable that the polymer contain at least about 3.5 percent by weight unsaturation.

As indicated above, it is difficult to accurately determine the extent of unsaturation in these products by ordinary analytical techniques. For example, iodine value determinations have been found to be unreliable, and accurate analysis by chemical means in general requires very tedious and time-consuming procedures. One method which is applicable and which is usually convenient is by means of infra-red spectroscopic examination. Using such a method, the infra-red curve of the interpolymer is obtained in which the unsaturation is exhibited by a characteristic peak, for example, at about 3.3 microns in carbon tetrachloride solutions of interpolymers containing dicyclopentadiene (other solvents may shift this peak somewhat). The quantitative extent of unsaturation is determined by comparing the characteristic peak obtained from the interpolymer with that of a known material of similar structure and previously determined unsaturation level. Other techniques using infrared examination can also be employed.

Another method for determining the extent of unsaturation is by means of nuclear magnetic resonance spectroscopy. This is particularly applicable to interpolymers containing unsaturation derived from polyunsaturated compounds with residual unsaturation resulting from

linkages, where R is hydrogen or alkyl, as in the case of the preferred interpolymers produced from dicyclopentadiene and similar polyunsaturated hydrocarbons. This method is described in detail in application Ser. No. 413,326, now U.S. Pat. No. 3,496,129, as well as in Belgian Pat. No. 692,486, which are incorporated by reference.

It should be noted that the reactivity of the interpolymers herein is such that small but significant amounts of unsaturation may be lost by oxidation or other reaction during handling. This is especially true of small samples used for analysis. Therefore, it is desirable to protect the samples as much as possible, using, for example, an inert gas blanket, and to minimize handling and exposure. Otherwise, low values may be obtained on analysis. For this reason, it is usually better to rely on the curing characteristics as indicative of the necessary extent of unsaturation, with numerical values being used chiefly for comparison of samples handled similarly.

The proportions of the components of the interpolymer can be varied widely, it being necessary only to provide sufficient unsaturation in the polymer to permit oxidative curing. The amount varies with the particular polyunsaturated compound. For instance, there should be interpolymerized along with the monoolefin or monoolefins at least about 11 percent of dicyclopentadiene or similar diene.

Among the polyunsaturated compounds that can be employed in producing the non-rubbery interpolymers herein are the various cyclic dienes and other cyclic polyenes. It is preferred that the polyunsaturated hydrocarbon contain nonconjugated ethylenic groups, and it is preferred that it be alicyclic, this being particularly the case when the polyunsaturated compound contains conjugated unsaturation. Thus, nonconjugated polyenes and conjugated alicyclic polyenes are preferred.

Included among the polyunsaturated compounds that can be employed are cyclic polyenes such as cycloalkadienes; and substituted norbornenes, e.g., 5-alkenyl-2-norbornenes; substituted norbornadienes, e.g., 2-alkyl norbornadienes. The polyene may contain substituents, such as halogen or oxygen-containing radicals, but in general, it is preferred to employ unsubstituted hydrocarbons containing only carbon and hydrogen.

Some representative examples of specific polyunsaturated compounds which can be utilized are:

1,3-cyclopentadiene
1,3-cyclooctadiene
Methyl-1,3-cyclopentadiene
1-methyl-3-isopropyl-1,3-cyclopentadiene
Dicyclopentadiene
Tricyclopentadiene
Methyl-1,3-cyclopentadiene dimer
2-methyl-4-ethyl-1,3-cyclopentadiene dimer
1,4-cyclohexadiene
1,5-cyclooctadiene
1,5-cyclododecadiene
1,5,9-cyclododecatriene
1,4,6-cyclooctatriene
5-(2'-butenyl)-2-norbornene
5-(2'-ethyl-2-butenyl)-2-norbornene
5-(1,5-propenyl)-2-norbornene
5-(2'-heptyl-1'-undecenyl)-2-norbornene
5-(2'-propyl-2'-pentenyl)-2-norbornene
5-methylene-2-norbornene
2 methyl norbornadiene
2-ethyl norbornadiene
2-isopropyl norbornadiene
2-heptyl norbornadiene
1,8(9)-p-menthadiene
5-vinylbicyclo[2.2.1]hept-2-ene
Bicyclo[4.3.0]nona-3,7-diene Preferably the cyclic polyene is selected from the group consisting of cyclopentadiene, dicyclopentadiene, tricyclopentadiene, methylcyclopentadiene and methylcyclopentadiene dimer. More preferably, the cyclic polyene is dicyclopentadiene.

Any monoolefin having a single copolymerizable ethylenic group can be interpolymerized with the polyene. Although interpolymers satisfactory for some purposes can be made by interpolymerizing the polyunsaturated compound with a single monoolefin, e.g., copolymers of ethylene and dicyclopentadiene, or propylene and dicyclopentadiene, it is preferred to employ at least two comonomers with the polyunsaturated compound, one of these being ethylene. It is further preferred that ethylene comprise a substantial proportion of the interpolymer, i.e., at least about 30 percent by weight. It is desirable that the interpolymer be amorphous rather than substantially crystalline, and the tendency of ethylene to form crystalline polymers is reduced by the inclusion of a second comonomer.

Thus, a class of preferred interpolymers comprises a nonconjugated diene, ethylene, and at least one other monoolefin having a single terminal ethylenic group.

Of the large number of usable monoolefins, the preferred comonomers include those having the formula

wherein R is alkyl having, for example, up to 20 carbon atoms, and R' is hydrogen or alkyl of up to about 20 carbon atoms. Compounds of this class include propylene, 2-methylpropene, 2-propylhexene-1, 1-butene, 4-methyl-1-pentene, 1-pentene, 1-hexene, 1-octane, 5-methyl-1-nonone, 5,6,6-trimethyl-1-decene, 1-dodecene, 1-tetradecene and 1-octadecene.

The proportion of the second comonomer is not critical since, as mentioned, copolymers of a single monoolefin of the class described with the polyunsaturated compound can be employed. The preferred proportions vary depending on the identity of the particular monomers. For example, interpolymers of ethylene, propylene, and a nonconjugated diene, usually dicyclopentadiene, are among the most desirable interpolymers herein. Such interpolymers generally contain from about 10 percent to about 70 percent of ethylene, from about 10 percent to about 40 percent of propylene, and from about 5 percent to about 50 percent of the diene. It will be understood that the minimum amount of diene that can be employed depends to some extent upon its molecular weight. (The above percentages are by weight; the same is true of all parts and percentages throughout this specification unless otherwise specified.)

The interpolymers having the properties set forth above are produced from the foregoing monomers by carrying out the interpolymerization in the presence of a catalyst composed of an organic vanadium compound and an alkyl aluminum halide co-catalyst.

The most efficient organic vanadium compounds have been found to be vanadium tris(acetylacetonate) and vanadium oxybis(acetylacetonate). The amount of vanadium compount catalyst present is highly important in obtaining interpolymers of the desired properties. The concentration of catalyst employed is defined in terms of the concentration of the vanadium compound in the reaction mixture. It has been found that this concentration is preferably maintained at no higher than 0.002 mole per liter in order to produce the desired products in efficient amounts. The minimum concentration is not critical, since any amount produces some product. It is generally preferred to have present at least about 0.001 millimole of vanadium compound per liter.

The alkyl aluminum halide co-catalyst utilized along with the vanadium compound is typically ethyl aluminum dichloride, ethyl aluminum sesquichoride, diethyl aluminum chloride, butyl aluminum sesquichloride, ethyl aluminum sesquiiodide, or other alkyl aluminum halide. The concentration of the co-catalyst is not ordinarily critical; it is usually employed in an amount between about 3 and about 30 moles per mole of vanadium compound.

In carrying out the process, there is employed a liquid reaction medium, which is suitably an organic solvent or one of the reactants in liquid form. Suitably purified xylene or similar aromatic solvent is generally utilized. For efficient operation, care should be taken to exclude oxygen in moisture. The temperature is maintained at room temperature or preferably below, e.g., 15° C. or lower, with temperatures as low as −80° C. or lower being advantageously utilized. One or more of the reactants is usually a gas, and they are generally fed to the reaction vessel as the polymerization progresses. Atmospheric pressure can be utilized in carrying out the interpolymerization reaction, but it is usually more efficient to employ elevated pressures, even up to 1000 atmospheres or more.

There is usually also included in the reaction mixture a molecular weight regulator, such as hydrogen, zinc dialkyl, norbornadiene or 4-vinylcyclohexene-1, which aids in obtaining low molecular weight interpolymers.

The amount of phosphite and epoxide employed may be varied widely. Any effective yellowness retarding amount of the mixture of stabilizers may be employed. Generally, there is employed from 0.1 to 5.0 phr. (part per 100 parts of interpolymer) and preferably 0.5 to 3.0 of the phosphite and from about 0.5 to about 20.0 phr and preferably 1.0 to 10.0 phr. of the epoxide. Preferably, the amount of epoxide is from 50 percent to 500 percent on the weight of the phosphite.

Below are several illustrations of the manner in which the interpolymers employed herein are ordinarily produced:

Interpolymer A

A clean, dry reaction vessel was flushed with nitrogen gas and charged with 10 liters of dried benzene. Ethylene and propylene were passed into the solvent at a rate of 6.0 liters and 12.0 liters per minute, respectively, and there were added 176 milliliters of dicyclopentadiene, 50.4 milliliters of bicyclo[2.2.1]hepta-2,5-diene, and 27.4 milliliters of a 1.4 molar solution of ethyl aluminum sesquichloride in benzene. While maintaining the temperature at about 5° C., 50 milliliters of a 0.02 molar sodium of vanadium oxybis(acetylacetonate) in benzene were introduced. The off-gas rate dropped and the ethylene and propylene rates were increased to 10 and 20 liters per minute for one minute, during which the off-gas rate again rose. There were then added 10 milliliters of bicycloheptadiene, 35.2 milliliters of dicyclopentadiene, and 50 milliliters of the vanadium oxybis(acetylacetonate) solution. When absorption decreased the above additions were again made, and this was repeated for a total of six additions. The polymerization was carried out for a total of 44 minutes from the time of the first vanadium catalyst addition. Methanol was added to the reaction mixture and it was washed with aqueous HCl, and then washed acid free with distilled water. The benzene was stripped at reduced pressure and replaced with about 2 liters of mineral spirits, and stripping continued until the solution had a solids content of about 43 percent and a Gardner-Holdt viscosity of Y-. Infrared analysis of the product showed the absence of free dicyclopentadiene and indicated that the approximate polymer composition was 50 percent ethylene, 20 percent propylene, and 30 percent dicyclopentadiene, all in polymerized form. The intrinsic viscosity of the interpolymer was 0.25 diciliter/gram.

Interpolymer B

A clean, dry reaction vessel was charged with 2.0 liters of dried benzene and sparged with nitrogen for 15 minutes. While passing ethylene and propylene at the rate of six liters per minute each into the solution, there were added 35.4 milliliters of dicyclopentadiene, and 10.1 milliliters of bicycloheptadiene. The mixture was cooled to 5° C., and 2.0 milliliters of a 1.2 molar solution of ethyl aluminum sesquichloride in benzene were then added. Cooling was maintained throughout the polymerization, which was initiated by the addition of 4.0 milliliters of a 0.05 molar solution of vanadium tris(acetylacetonate) in benzene. Polymerization began immediately, as evidenced by the rise in temperature to 8° C. and complete absorption of all gasses passing into the solution, i.e., no off-gas could be observed. After about one minute, off-gas began to be observed once more; reaction conditions were maintained for six minutes after the addition of the vanadium compound, during which time the temperature dropped slowly to 5° C. The reaction was terminated by the addition of methanol, and the reaction mixture was washed first with aqueous HCl and then washed acid-free with distilled water. Benzene was stripped off and replaced with aromatic naphtha (boiling range 150° C. to 170° C.), and stripping was continued until the solution had a solids content of 25.0 percent and a Gardner-Holdt viscosity of E. The intrinsic viscosity of the interpolymer produced was 0.20 diciliter/gram.

Interpolymer C

Following a similar procedure to those described, a copolymer of ethylene and dicyclopentadiene was made from the following reaction mixture:

| | Milliliters |
|---|---|
| Benzene | 2000 |
| Norbornadiene | 10 |
| Dicyclopentadiene | 40.7 |
| Ethyl aluminum sesquichloride (1.2 molar solution in benzene) | 2.0 |
| Vanadium tris(acetylacetonate) (0.05 molar solution in benzene) | 4.0 |

The reaction mixture was maintained at about 20° C. and ethylene was passed into the solution at a rate of 12 liters per minute. The product had a solids content to 50 percent and a Gardner-Holdt viscosity of $Z_{10}$. The copolymer obtained had an intrinsic viscosity of 0.24 deciliter/gram.

Set forth below are several examples of the invention illustrating certain embodiments thereof. It will be understood that the invention is not to be construed as being limited to the details given. All parts and percentages in the examples as well as throughout the specification are by weight unless otherwise specified.

EXAMPLE I

The interpolymer utilized in this example contained 38.3 percent ethylene, 21.0 percent propylene and 40.7 percent dicyclopentadiene. The interpolymer had an intrinsic viscosity in benzene at 25° C. of 0.21.

A coating composition was formulated as follows:

| | Parts by wt. |
|---|---|
| Interpolymer | 25.1 |
| TiO₂ pigment | 22.9 |
| Mineral spirits | 51.6 |
| Soya lecithin | 1.2 |

Films of the above coating composition were drawn on phosphatized steel panels to give a one mil dry film. Yellowness index (Y-I on a spectrophotometer) was determined at various bake schedules.

Composition A is the above coating composition containing 2.5 parts per hundred parts (phr.) of a tris(nonylphenyl)phosphite and 2.5 phr. of epoxidized soya oil. The tris(nonlyphenyl)phosphite employed was "Polygard," a tris(mixed mono-dinonylphenyl)phosphite and has at the time of manufacture been treated with a small amount (e.g., 1.5 percent on the weight of phosphite) of propylene oxide to free it from traces of acid impurities. The epoxide employed was Paraplex G-62, an epoxidized soy bean oil with an average molecular weight of 1000.

Composition B is the above composition without added stabilizers as a control.

| | Bake schedule | Solvent resistance | Yellowness index |
|---|---|---|---|
| Composition: | | | |
| A | Not baked | | -4.89 |
| B | do | | -3.48 |
| A | 60 minutes, 250° F | Excellent | -4.66 |
| B | do | Poor | -2.44 |
| A | 15 minutes, 350° F | Excellent | +3.31 |
| B | do | do | +8.67 |
| A | 5 minutes, 400° F | Good | -3.71 |
| B | do | Excellent | +3.13 |

[1] The more negative the yellowness index, the whiter the film.

In a manner similar to the illustration above, reduced yellowing may be achieved by utilizing the other phosphites and epoxides disclosed in place of those specifically employed. In a similar manner, the specific resin may be replaced by any from the above-disclosed resin class and similar results obtained.

According to the provisions of the patent statutes, there are described above the invention and what are now considered to be its best embodiments. However, within the scope of the appended claims, it is to be understood that the invention can be practiced otherwise than as specifically described.

What is claimed is:
1. A color stabilized composition comprising:
(A) a non-rubbery interpolymer of a cyclic polyene and at least one monoolefin having a single copolymerizable ethylenic group, said interpolymer having an essentially saturated carbon chain containing a substantial proportion of the total carbon atoms in the polymer molecule, an intrinsic viscosity of 0.6 or lower and at least about 2.5 percent by weight of ethylenic unsaturation in the polymer molecule; and
(B) a stabilizing amount of a mixture of a tri(alkylphenyl)phosphite in which the alkyl group has from 8 to 30 carbon atoms and an epoxide selected from the group consisting of epoxidized soya bean oil and epoxidized esters of fatty acids having from 10 to 30 carbon atoms with alkanols having up to 10 carbon atoms.

2. The composition of claim 1 wherein the interpolymer contains ethylene.

3. The composition of claim 1 wherein the interpolymer contains ethylene and at least one other monoolefin.

4. The composition of claim 3 wherein the other monoolefin is propylene.

5. The composition of claim 1 wherein the phosphite is a tri(nonylphenyl)phosphite and the epoxide is an epoxidized soya bean oil.

6. A composition as in claim 1 comprising:
(A) a non-rubbery interpolymer of a cyclic polyene selected from the group consisting of 1,3-cyclopentadiene, 5-methyl-1,3-cyclopentadiene, dicyclopentadiene, tricyclopentadiene and 5-methyl-1,3-cyclopentadiene dimer and at least one monoolefin having a single copolymerizable ethylenic group selected from the class consisting of

where R is hydrogen or an alkyl group having up to 20 carbon atoms and R' is hydrogen or an alkyl group containing up to 20 carbon atoms, said interpolymer having an essentially saturated carbon chain containing a substantial proportion of the total carbon atoms in the polymer molecule, an intrinsic viscosity of 0.4 or lower, and at least about 3.5 percent by weight of ethylenic unsaturation in the polymer molecule; and
(B) a stabilizing amount of a mixture of a tri(alkylphenyl)phosphite in which the alkyl group has from 8 to 30 carbon atoms and an epoxide selected from the group consisting of epoxidized soya bean oil and epoxidized esters of fatty acids having from 10 to 30 carbon atoms with alkanols having up to 10 carbon atoms.

7. The composition of claim 6 wherein the interpolymer contains ethylene.

8. The composition of claim 6 wherein the interpolymer contains ethylene and at least one other monoolefin.

9. The composition of claim 8 wherein the other monoolefin is propylene.

10. The composition of claim 6 wherein the phosphite is a tri(nonylphenyl)phosphite and the epoxide is an epoxidized soya bean oil.

11. The composition of claim 6 wherein the cyclic polyene is dicyclopentadiene.

12. The composition of claim 11 wherein the interpolymer contains ethylene.

13. The composition of claim 11 wherein the interpolymer contains ethylene and at least one other monoolefin.

14. The composition of claim 13 wherein the other monoolefin is propylene.

15. The composition of claim 11 wherein the phosphite is a tri(nonylphenyl)phosphite and the epoxide is an epoxidized soya bean oil.

References Cited
UNITED STATES PATENTS

| | | | |
|---|---|---|---|
| 3,361,691 | 1/1968 | Mazzeo | 260—23.7 |
| 3,442,839 | 5/1969 | Gerhart et al. | 260—23.5 |

DONALD E. CZAJA, Primary Examiner

D. J. BARRACK, Assistant Examiner

U.S. Cl. X.R.

260—23, 23.5, 33.6, 41, 41.5, 45.7, 45.8